United States Patent

[11] 3,587,269

| [72] | Inventors | Robert J. Seccombe<br>Detroit;<br>Jack E. Willson, Livonia, Mich. |
|---|---|---|
| [21] | Appl. No. | 831,166 |
| [22] | Filed | June 6, 1969 |
| [45] | Patented | June 28, 1971 |
| [73] | Assignee | Ingersoll-Rand Company, New York, N.Y. |

[54] APPARATUS AND METHOD FOR BALL SIZING HOLES IN WORKPIECES
7 Claims, 5 Drawing Figs.

[52] U.S. Cl. .................................................. 72/75, 29/90, 72/370, 72/453
[51] Int. Cl. .................................................. B21j 9/00
[50] Field of Search .......................................... 72/75, 370, 453, 429, 280, 462; 29/90, 149.5; 59/35

[56] References Cited
UNITED STATES PATENTS

| 1,095,265 | 5/1914 | Brinkman | 72/75 |
|---|---|---|---|
| 1,360,558 | 11/1920 | Mattsson | 29/90 |
| 2,799,340 | 7/1957 | Mueller | 72/75 |
| 2,914,839 | 12/1959 | Schwenger | 72/370 |
| 3,021,596 | 2/1962 | Yowell | 72/370 |
| 3,196,653 | 7/1965 | Gazan | 72/453 |

Primary Examiner—Charles W. Lanham
Assistant Examiner—Gene P. Crosby
Attorneys—Carl R. Horten and David W. Tibbott ABSTRACT: A block is provided with internal vertical and curved conduits, with the curved conduit intersecting the vertical conduit. A workpiece having a hole therein is placed in a work station with the hole aligned with the vertical conduit. A ram drives a sizing ball up through the workpiece to the top of the vertical conduit, whereupon a deflecting surface moves the ball into the curved conduit where it descends under the influence of gravity to the bottom of the curved conduit for reuse.

A second ball in the curved conduit acts as a gate to keep the first ball in position on the ram during initial upward movement.

PATENTED JUN 28 1971  3,587,269
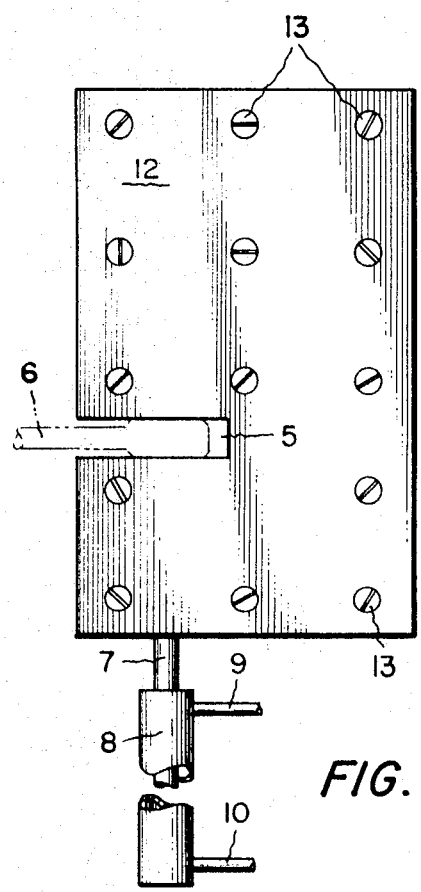
FIG. 1
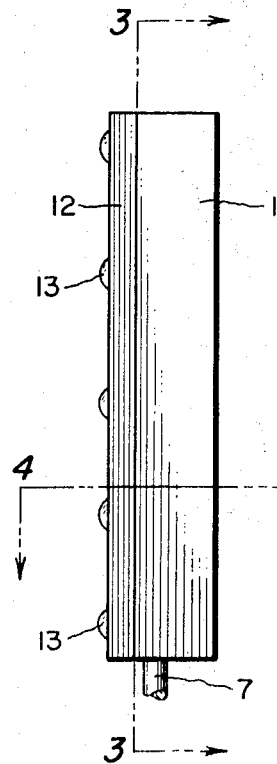
FIG. 2
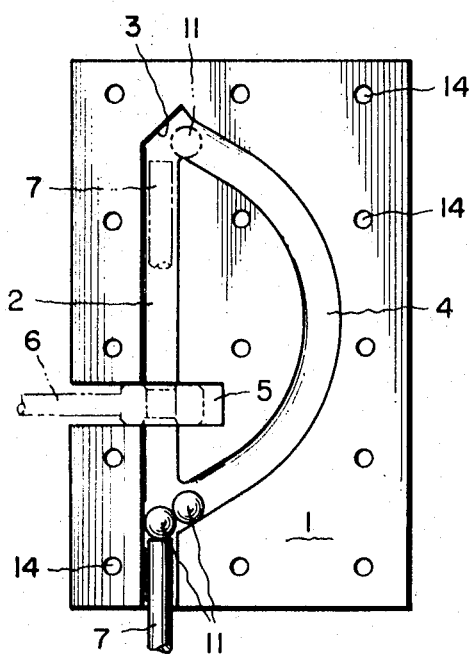
FIG. 3
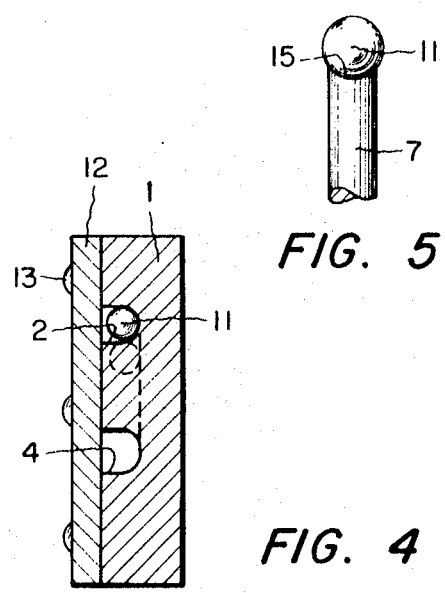
FIG. 5
FIG. 4
INVENTORS
ROBERT J. SECCOMBE
JACK E. WILLSON
ATTORNEY

APPARATUS AND METHOD FOR BALL SIZING HOLES IN WORKPIECES

BACKGROUND OF THE INVENTION

This invention relates broadly to apparatus and method for ball sizing holes. More specifically, this invention relates to apparatus and method for use in production and by means of which a plurality of workpiece may have cylindrical holes therein rapidly and accurately ball sized.

Ball sizing of cylindrical holes is a technique which has long been known and used. Such a technique, comprising the steps of first forming in the workpiece an approximately accurate hole of slightly smaller diameter than the finished hole to be produced (as, for instance, by boring or turning on a lathe and broaching), and then finishing the hole to accurate diameter by means of one or more spherical polished and hardened steel balls which are driven through the hole by any suitable means, is shown in U.S. Pat. No. 1,360,558 (1920) to Mattsson. The ball, in being driven through the hole, exerts forces on the perimeter of the hole in excess of the elastic limit of the material surrounding the hole, and in this manner the hole is enlarged and a very accurate circularly cylindrical opening is formed through the workpiece.

Conventional ball sizing apparatus for use in production work have commonly employed a first reservoir of balls which were singly fed to a pressing apparatus and forced through the holes to be ball sized. A second reservoir was employed to catch the balls after they were driven through the holes in the workpieces during the production run. Periodically, the contents of the second reservoir were transferred to the first reservoir for reuse. A large number of balls were required, and the economics involved in determining the investment in such an inventory of balls placed a practical limit upon the cost of each ball, and therefore upon the accuracy and hardness of each ball. Additionally, as the balls were stored in contact with each other, both before and after the ball sizing operation, and being of the same hardness, the surface finish of the balls would deteriorate which would adversely affect the accuracy of the holes thereafter to be sized by the said balls.

An effort was made to improve upon conventional methods and apparatus, as shown in U.S. Pat. No. 3,196,653 (1965) to Gazen. In this apparatus, only one ball was used, and was driven down through the hole to be sized, and thereafter was literally blown up by means of fluid pressure along a curved track to be engaged at the driving station above the work piece by means of spring-loaded fingers, which fingers yielded when the driving ram was actuated. However, this apparatus was somewhat complex in requiring the use and precision timing of the fluid pressure ball elevator, and the spring-loaded fingers obviously were subject to wear and malfunction.

The present invention is directed to improved ball sizing method and apparatus exhibiting the utmost simplicity and reliability of operation throughout the longest production runs and under the most severe operating conditions.

SUMMARY OF THE INVENTION

One of the objects of this invention is to provide improved apparatus and method for ball sizing holes in workpieces.

Another of the objects of this invention is to provide improved method and apparatus offering simplicity and reliability quite inexpensive in construction and operation, requiring very little maintenance, and which will perform satisfactorily during extended production runs under the most severe operating condition.

Still other and further objects of this invention will become apparent during the course of the following description and by reference to the accompanying drawing and the appended claims.

Briefly, it has been discovered that the foregoing objects may be attained by driving the ball upwardly through the hole in the workpiece, by providing a deflecting surface which deflects the ball laterally from the direction of the driving tool after the latter has driven the ball through the hole, the said deflected ball then entering a track and being returned by gravity along to the driving station below the workpiece. In the preferred embodiment, two balls are employed, one to act as a gate to keep the first ball in position on the driving tool or ram in its initial upward movement toward the workpiece.

BRIEF DESCRIPTION OF THE DRAWING

Referring now to the drawing, in which like numerals represent like parts in the several views:

FIG. 1 represents a view in front elevation of the apparatus of the present invention, showing the workpiece in phantom.

FIG. 2 represents a view in side elevation of the apparatus of the present invention, the fluid power cylinder being omitted to simplify this figure.

FIG. 3 represents a view in front elevation of the apparatus of the present invention with the cover plate removed, showing the vertical and curved conduits constituting the internal track, the workpiece in phantom, and the uppermost position of the ram in phantom together with a ball which has just been deflected from the top of the ram in its uppermost position and which has entered the top of the curved conduit, the said FIG. 3 being viewed along the line 3-3 of FIG. 2, the fluid power cylinder being omitted to simplify this figure.

FIG. 4 represents a horizontal section taken along the line 4-4 of FIG. 2.

FIG. 5 represents an enlarged view of the upper portion of the ram and the ball supported thereby, showing a modification in the configuration of the upper portion of the ram, namely a concavity therein to receive the said ball.

DESCRIPTION OF THE PREFERRED EMBODIMENT

The preferred embodiment of apparatus comprises a block 1 having formed therein a vertical conduit 2 extending from the bottom of the block 1 to a point adjacent the upper portion of the said block 1. A deflecting surface 3 is formed in block 1 oblique to and adjacent the top of vertical conduit 2 and generally faces the top of a curved conduit 4 of generally C shape which, in its downward direction, curves away from vertical conduit 2 and which, at some intermediate point curves towards vertical conduit 2 finally reentering vertical conduit 2 as shown in FIG. 3. Vertical conduit 2 and curved conduit 4 together constitute a closed trackway for purposes to be hereinafter described.

Block 1 is indented with a recess to provide work station 5 for workpiece 6, the said work station 5 intersecting vertical conduit 2. Conventional means, such as a jig or other work-supporting device or fixture (not shown, but well known to those familiar with this art), may be employed to accurately position workpiece 6 in work station 5, thereby to accurately align the hole to be ball sized in the said workpiece 6 with vertical conduit 2.

A ram 7, suitably dimensioned to move freely along vertical conduit 2, from the bottom to the top thereof, is provided, the said ram 7 being connected to fluid power cylinder 8 having fluid inlet/outlet connections 9 and 10 leading to a suitable source of pressurized fluid and sump (not shown, but well known to those familiar with this art), whereby upon pressurizing the fluid power cylinder 8 below the piston therein, the ram 7, connected to the said piston, can be driven upwardly with great force to a point adjacent the top of vertical conduit 2, and whereby, upon making the proper fluid connections, the ram 7 can be lowered to a position adjacent the lower portion of vertical conduit 2.

In the preferred embodiment, two sizing balls 11 are employed, these balls 11 being proportioned to move freely along the closed trackway constituted by vertical conduit 2 and curved conduit 4. In the embodiment illustrated, those portions of vertical conduit 2 and curved conduit 4 remote from the left side (as viewed in FIG. 2) of block 1 are curved to generally match the curvature of balls 11, the said vertical conduit 2 and curved conduit 4 being opened to intersect the said left side ( as viewed in FIG. 2) of block 1 in parallel sides as shown in FIG. 4. Cover plate 12, fastened to block 1 by means of screws 13 extending into threaded openings 14 in the said block 1, closed the open sides of vertical conduit 2 and curved conduit 4.

It will, of course, be understood that that portion of block 1 bordering vertical conduit 2 and curved conduit 4, as well as cover plate 12, are preferably made of rigid plastic or metal which will be relatively soft in comparison to ball 11.

The operation of the preferred embodiment of the invention will now be described.

Workpiece 6, having formed therein a hole of somewhat smaller diameter than that desired, which hole is to be ball sized, is placed in work station 5, the hereinbefore mentioned jig or fixture being employed if desired to insure accurate centering of said hole with respect to vertical conduit 2. Preferably, the width of the opening of work station 5 permits workpiece 6 to be freely received therein without substantial play in a vertical direction. Ram 7 is assumed to be in its lowermost position, with one ball 11 supported on the top of ram 7, and with the other ball 11 bearing against the said first ball 11, all as shown in solid lines in FIG. 3. Fluid power cylinder 8 is pressurized below its piston, and ram 7 commences its upward movement. It will be noted that, until that ball 11 supported on ram 7 has passed above the point of reentry of curved conduit 4 into vertical conduit 2, the other ball 11, in curved conduit 4, bears against the first-mentioned ball 11 and thus acts as a gate to prevent the first-mentioned ball 11 from backing into the lower portion of curved conduit 4 or, worse, from jamming into that portion of block 1 at the top of the point of reentry of curved conduit 4 into vertical conduit 2. As ram 7 rises to close off the point of reentry of the curved conduit 4 into vertical conduit 2, the other said ball 11 will merely slide or roll along the lateral surface of the said ram 7. Continued operation of fluid power cylinder 8 forces ball 11 through the hole in the workpiece 6, thereby ball sizing said hole, the workpiece bearing against the top of the work station 5. As the ram 7 rises and itself passes freely through the said ball sized hole in the workpiece 6 (it being understood, of course, that the diameter of the ram 7 is somewhat less than the diameter of the sizing ball 11), the ram 7 will reach a point where the ball 11 supported thereby engages deflecting surface 3 and is laterally dislodged from the top of ram 7 into the uppermost portion of curved conduit 4 (as shown in phantom in FIG. 3), whereupon gravity alone will cause ball 11 to descend through curved conduit 4 until the ball 11 gently engages the side of the other ball 11 theretofore acting as the gate at the bottom of curved conduit 4. Fluid power cylinder 8 is then operated to lower ram 7 through workpiece 6 to the bottom of its stroke where upon ball 11 enters vertical conduit 2 to sit on the top of ram 7. Workpiece 6 with its ball sized hole is then removed from work station 5, and the next workpiece 6 is inserted in work station 5.

Under some conditions, it may be possible to operate with only one ball 11, thereby dispensing with the use of the second ball 11 as a gate.

Moreover, under yet other conditions, the ball 11 immediately after leaving the hole in the workpiece 6 may be projected upwardly with some velocity. In this event, the upwardly flying ball 11, free of ram 7, may carom off deflecting surface 3 into curved conduit 4; thus, ram 7 need not be extending fully to the top of its stroke but may immediately be lowered. Under this mode of operation, the top of ram 7 may be provided with a recess, such as a concavity 15 corresponding with a portion of the curvature of ball 11, as shown in FIG. 5, whereupon the use of a second ball 11 as a gate may be effectively dispensed with.

We claim:

1. Apparatus for ball sizing a hole in a workpiece, said apparatus comprising:
 a block;
 a vertical conduit formed in said block and extending upwardly from the bottom of said block;
 a second conduit formed in said block, the top of said second conduit communicating with the top of said vertical conduit, the bottom of said second conduit communicating with said vertical conduit at a point intermediate the top and bottom of said vertical conduit;
 deflecting means in said block adjacent the top of said vertical conduit and generally facing the top of said second conduit;
 a recess formed in said block, said recess intersecting said vertical conduit at a point above the bottom said second conduit and below the top of said vertical conduit, said recess constituting a work station adapted to receive said workpiece and to permit the hole in said workpiece to be aligned with said vertical conduit;
 a ram mounted in said vertical conduit, said ram being adapted to be reciprocated between a position in which the top of said ram is below the bottom of said second conduit and a position in which the top of said ram is adjacent the top of said vertical conduit;
 power operated means to raise or selectively to lower said ram in said vertical conduit;
 a ball for ball sizing the hole in said workpiece;
 said vertical conduit and said second conduit constituting a closed trackway for said ball;
 the top of said ram being adapted to support and to elevate said ball in said vertical conduit;
 whereby when said ram is in its lowermost position, said ball will pass from the bottom of said second conduit into said vertical conduit and onto said ram;
 whereby said power operated means is adapted to elevate said ram and the ball supported thereby and to force said ball through the hole in said workpiece thereby ball sizing said hole, and whereby continued operation of said power operated means raises said ram and the ball supported thereby until said ball engages said deflecting means and is forced from the top of said ram into the top of said second conduit;
 and whereby said ball descends under the influence of gravity through said second conduit to the bottom thereof.

2. Apparatus as in claim 1, further comprising:
 the middle portion of said second conduit being farthest horizontally removed from said vertical conduit and defining a curved path for said ball.

3. Apparatus as in claim 1, further comprising:
 a second ball in said second conduit, said second ball being adapted to bear against said first-mentioned ball and thereby to retain said first-mentioned ball in position on top of said ram during the initial upward movement of said ram in said vertical conduit.

4. Apparatus as in claim 1, further comprising:
 the top of said ram being provided with a concavity adapted to receive and support said first mentioned ball.

5. Method of ball sizing a hole in a workpiece by means of a sizing ball, comprising the following steps:
 supporting said workpiece with the axis of said hole extending a vertical direction;
 driving said sizing ball upwardly through a first path from a first station below said workpiece through said hole to a second station above said workpiece;
 allowing said sizing ball to return under the influence of gravity from said second station along a second path to said first station;
 repeating the foregoing steps in the same sequence for a plurality of workpieces.

6. Apparatus for ball sizing a hole in a workpiece, said apparatus comprising:
 a body;
 an upwardly facing vertically extending ram mounted in said body for reciprocation upwardly and downwardly over a vertical path;
 a workpiece locating and supporting station adapted to support the workpiece disposed in said vertical path and with the hole in workpiece aligned with said path;

a ball for ball sizing the hole in said workpiece and adapted to rest on said ram;

a ball trackway in said body extending vertically around said workpiece station and intersecting said vertical path of said ram above and below said workpiece station for conveying and returning said ball by the action of gravity from the end of the upward stroke of said ram above said station to the beginning of the upward stroke of said ram below said station, and means in said body for automatically moving said ball into the upper end of said trackway at the end of the upward stroke of said ram.

7. Apparatus for ball sizing a hole in a workpiece by means of a sizing ball, comprising:

a body for supporting the workpiece with the axis of its hole extending in a vertical direction;

ram means below said workpiece for driving said sizing ball upwardly through a first vertical path from below said workpiece through said hole to above said workpiece;

track means for conveying and allowing said sizing ball to return under the influence of gravity from above said workpiece along a second path to below said workpiece; and means for moving said ball into said track means after it passes upwardly through said workpiece.